United States Patent [19]

Pearlstein

[11] Patent Number: 5,076,592
[45] Date of Patent: Dec. 31, 1991

[54] HEAD GASKET WITH SEALING RINGS HAVING MULTI-STAGE COMPRESSIBILITY

[75] Inventor: Robert S. Pearlstein, Northbrook, Ill.
[73] Assignee: Fel-Pro Incorporated, Skokie, Ill.
[21] Appl. No.: 554,171
[22] Filed: Jul. 17, 1990

Related U.S. Application Data

[63] Continuation of Ser. No. 379,059, Jul. 13, 1989, abandoned.

[51] Int. Cl.$^5$ .............................................. F16J 15/12
[52] U.S. Cl. .................................. 277/180; 277/235 B
[58] Field of Search ............... 277/235 R, 180, 235 B

[56] References Cited

U.S. PATENT DOCUMENTS

| | | | |
|---|---|---|---|
| 1,103,912 | 7/1914 | Dunham | 277/234 |
| 1,819,694 | 8/1931 | Sperry | 277/235 B |
| 2,455,982 | 12/1948 | Dowty | 277/180 |
| 2,887,335 | 5/1959 | Lazar | 277/180 |
| 2,914,350 | 11/1959 | Smith | 277/180 X |
| 3,355,181 | 11/1967 | Olson | 277/180 |
| 3,467,398 | 9/1969 | Bernard | 277/180 |
| 3,473,813 | 10/1969 | Meyers et al. | 277/180 |
| 3,532,349 | 10/1970 | Czernik | 277/235 B X |
| 3,606,361 | 9/1971 | Pohl et al. | 277/235 B |
| 3,986,721 | 10/1976 | Decker | 277/180 X |
| 4,026,565 | 5/1977 | Jelinek | 277/180 |
| 4,369,980 | 1/1983 | Backlin | 277/180 X |
| 4,518,168 | 5/1985 | Belter | 277/235 B |
| 4,548,165 | 10/1985 | Vorobiev et al. | 277/235 B X |
| 4,591,170 | 5/1986 | Nakamura et al. | 277/234 X |
| 4,671,325 | 6/1987 | Otter | 277/180 X |
| 4,676,514 | 6/1987 | Beutter et al. | 277/235 B |
| 4,716,005 | 12/1987 | Ezekoye et al. | 277/180 X |
| 4,915,355 | 4/1990 | Fort | 277/235 R X |

FOREIGN PATENT DOCUMENTS

| | | | |
|---|---|---|---|
| 227853 | 9/1989 | Japan | 277/235 B |
| 2163496 | 2/1986 | United Kingdom | 277/180 |

*Primary Examiner*—Thomas B. Will
*Assistant Examiner*—Scott W. Cummings
*Attorney, Agent, or Firm*—Dressler, Goldsmith, Shore, Sutker & Milnamow, Ltd.

[57] ABSTRACT

A head gasket sealing assembly having a two-stage seal ring positioned to sealingly circumscribe each said combustion opening, each seal ring defining a pair of annular sections which are integrally formed, one of which lies radially inwardly of the other, one section being readily deformable and compressible and having a vertical dimension greater than that of the second section and providing an initial compressible seal, the second section being less readily deformable and compressible in use and providing a secondary seal and resistance to thermal push in use.

9 Claims, 2 Drawing Sheets

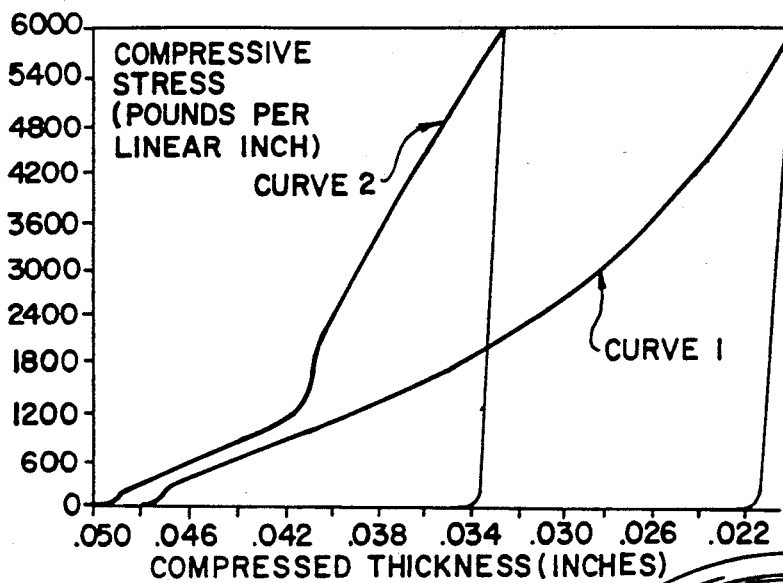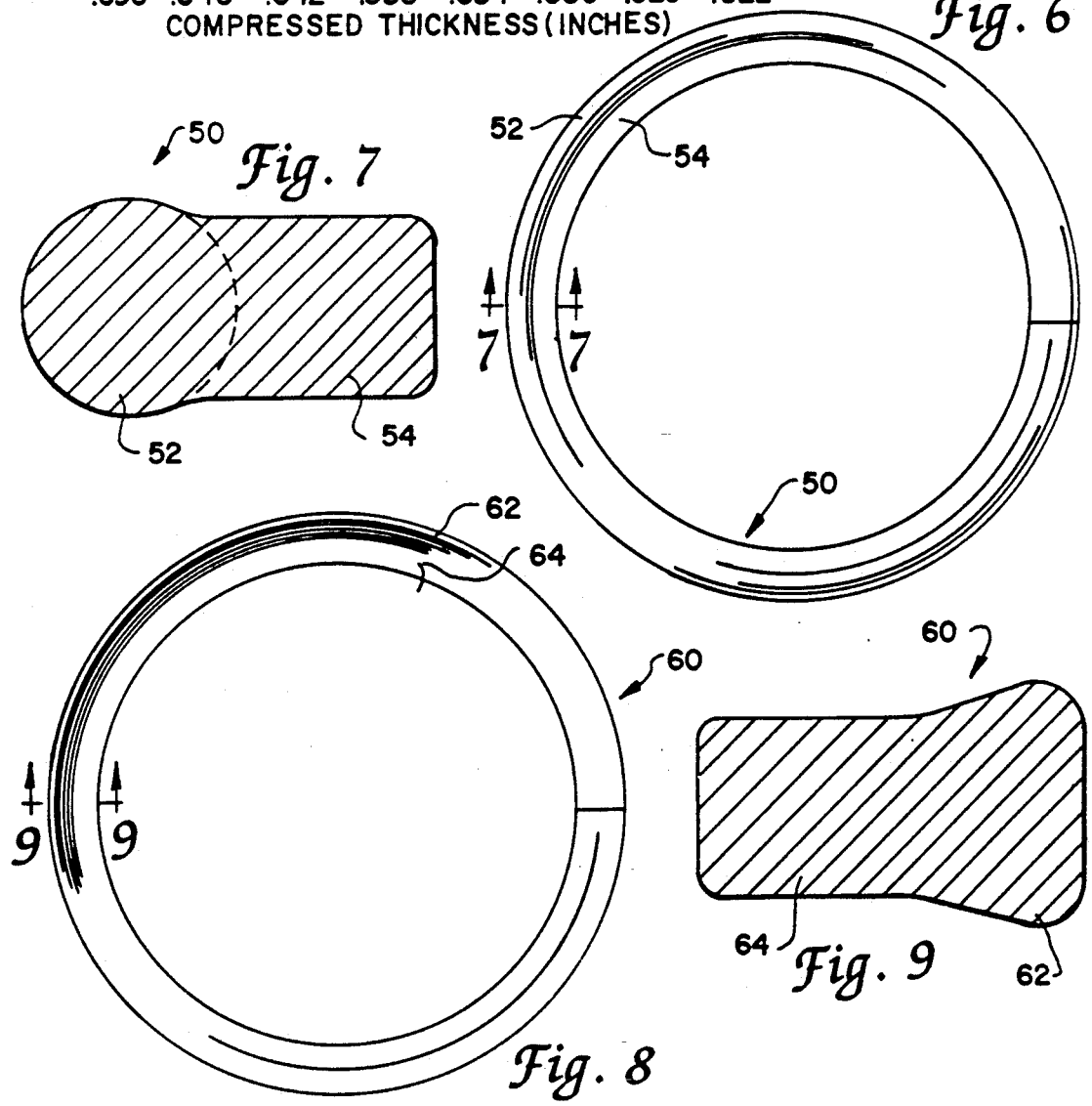

5,076,592

HEAD GASKET WITH SEALING RINGS HAVING MULTI-STAGE COMPRESSIBILITY

This application is a continuation of application Ser. No. 07/379,059, filed July 13, 1989, now abandoned.

BACKGROUND OF THE INVENTION

For many years now automotive engine head gasket have utilized sealing wires for surrounding and assisting in the sealing at engine combustion openings. Wires of a variety of materials and positioned with gasket bodies and/or armors in a variety of configurations have been used. Typically solid wires of circular cross-section have been used. These have usually been made of steel, although other materials have been used from time to time as well.

Wires of configurations other than circular in cross-section have been suggested for use as well. For example, the wire of Pohl U.S. Pat. No. 3,606,361 defines a body which is generally rectangular in cross-section, with sharp edged annular profiles generally centrally of the body for pressing into the cylinder block and cylinder head. These profiles appear to be intended to permanently deface the block and head to provide seals at the sharp edges.

A wide range of concerns face the gasket designer, particularly with today's lighter weight engines, and with engines fabricated from materials and masses of material which are much more prone to distortion in operation than were the conventional engines and materials of ten, twenty and thirty years ago. Today those circumstances and conditions such as thermal push present serious problems in designing effective combustion seals. Other circumstances, such as possible bore distortion resulting from gasket design, must also be taken into consideration.

Thus, improved designs for head gaskets and for mechanisms for effectively sealing at combustion openings are to be desired and are actively sought after.

SUMMARY OF THE INVENTION

In accordance with the present invention an improved head gasket sealing assembly which is adapted to be disposed between the head and block of an automotive engine is provided. The assembly comprises a generally flat, expansive main gasket body defining at least two combustion openings to be disposed in line with engine combustion chambers, and a two-stage combustion sealing means.

The combustion sealing means comprises a seal ring positioned to sealingly circumscribe each of the combustion openings. Each of said seal rings defines a pair of annular sections which are preferably integrally formed together, one section lying radially inwardly of the other. The one section is readily deformable and compressible and has a vertical dimension greater than that of the second section and provides an initial compressible seal. The second section is less readily deformable and compressible in use and provides a secondary seal and resistance to thermal push in use.

In a preferred form, the first section lies radially inwardly of the second section and is generally circular in radial cross-section. Alternatively, the section of the ring with the greater vertical dimension may lie radially outward of the thinner section. In another form, the first section is generally wedge-shaped in radial cross-section. Preferably the ring is formed of drawn wire, the ends of which are butt-connected.

Further objects, features and advantages of the present invention will become apparent from the following drawings and description.

BRIEF DESCRIPTION OF THE DRAWINGS

FIG. 5 is a load deflection graph comparing the load deflection of a typical round wire and of a seal ring of the present invention;

FIG. 6 is an enlarged plan view of an alternative seal ring of the present invention;

FIG. 7 is an enlarged cross-sectional view taken substantially along line 7—7 of FIG. 6;

FIG. 8 is an enlarged plan view of a further seal ring of the present invention; and FIG. 9 is an enlarged cross-sectional view taken substantially along line 9—9 of FIG. 8.

DESCRIPTION OF PRESENTLY PREFERRED EMBODIMENTS

Figure 1:
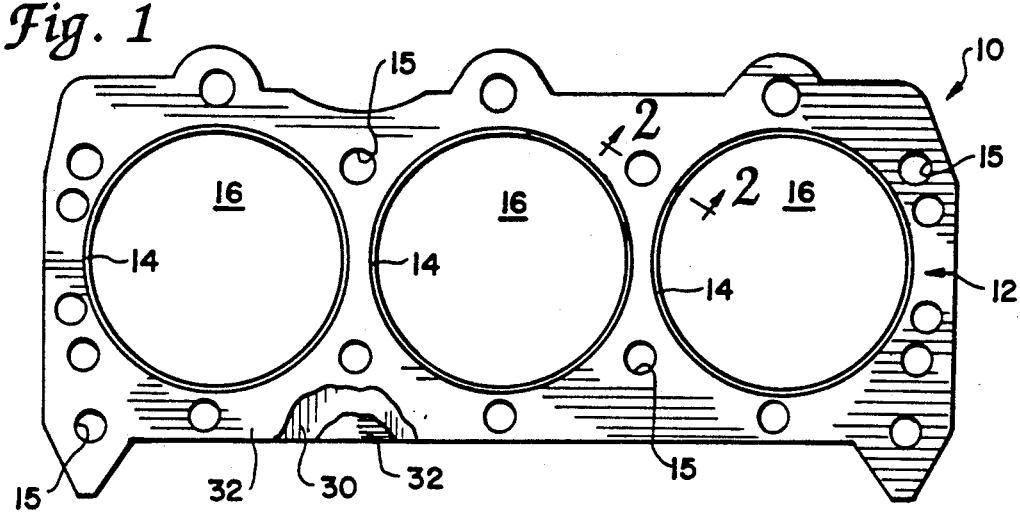
FIG. 1 is a plan view of a typical head gasket assembly employing the principles of the present invention.

Referring first to FIGS. 1-4, a head gasket assembly 10 of the present invention is seen to comprise a generally flat main gasket body 12 which defines a plurality of combustion openings 16, suitable oil, water and bolt openings 15, and armoring 14 for the combustion openings 16. In FIG. 1 a head gasket assembly 10 having three combustion openings 16 is shown for use in sealing an engine block B having cylinder bores C and a head H (FIG. 2), typically for one side of a V-6 engine.

The main gasket body 12 typically may comprise a laminate, such as of an imperforate or solid metallic core 30, and a pair of facing sheets 32. Core 30 may be a steel core. Facing sheets 32 are of a fiber reinforced composite and are laminated to core 30. The most popular and frequently used facings incorporate glass or other fibers and utilize nitrile, neoprene or polyacrylic elastomers to provide the self-sustaining facings. In the embodiment illustrated, the facings may have a thickness of about 0.015 inch, although, of course, this may vary with the application. Facing sheets 32 generally resist degradation by oils and coolants, retain torque, minimize extrusion, and exhibit heat resistance.

The main gasket body 12 is die cut or blanked out, such as with a stamping machine, punch press or other suitable form of equipment to provide three combustion openings, bolt holes and a plurality of fluid flow passageways, such as oil and water passageways 15. A typical gasket assembly body having the configuration shown in FIG. 1 may have a thickness of about 0.040 inch. Other configurations and thicknesses may be used depending upon the configuration and requirements of the engines with which the gasket assembly is to be used.

Figure 2:
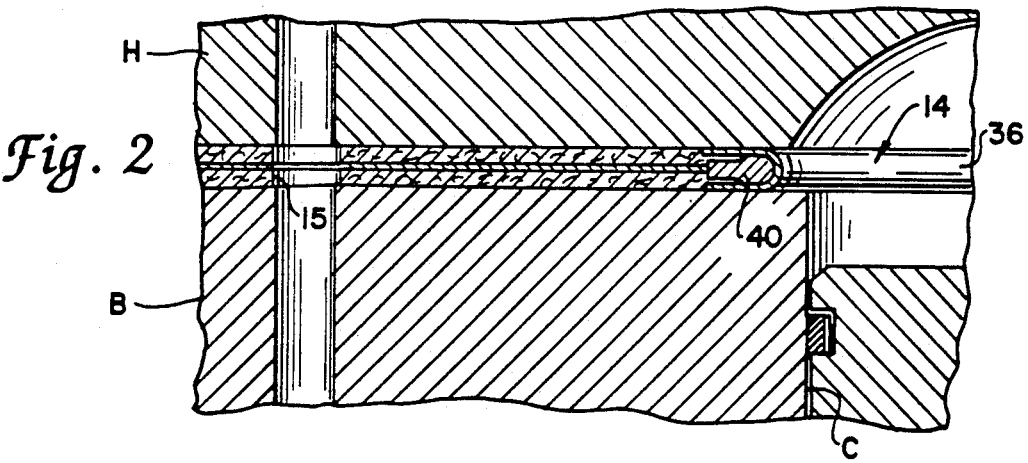
FIG. 2 is a section taken substantially along line 2—2 of FIG. 1 with the gasket in place between a head and a block of an engine and ready to be compressed therebetween into sealing engagement therewith.

In the embodiment of FIGS. 1 and 2 armoring 14 is seen to comprise an annular body 36, as of steel, in which a seal ring 40 is positioned. Body 36 is generally U-shaped in cross-section and may be formed about the seal ring 40 in a known and conventional manner. Armor body 36 is disposed to confront the combustion chamber or cylinder bore C in a conventional way. Seal ring 40 is disposed in a usual position occupied by a seal ring, namely closely adjacent to the closed end of the armor body 36, as is seen clearly in FIG. 2.

Figure 3:
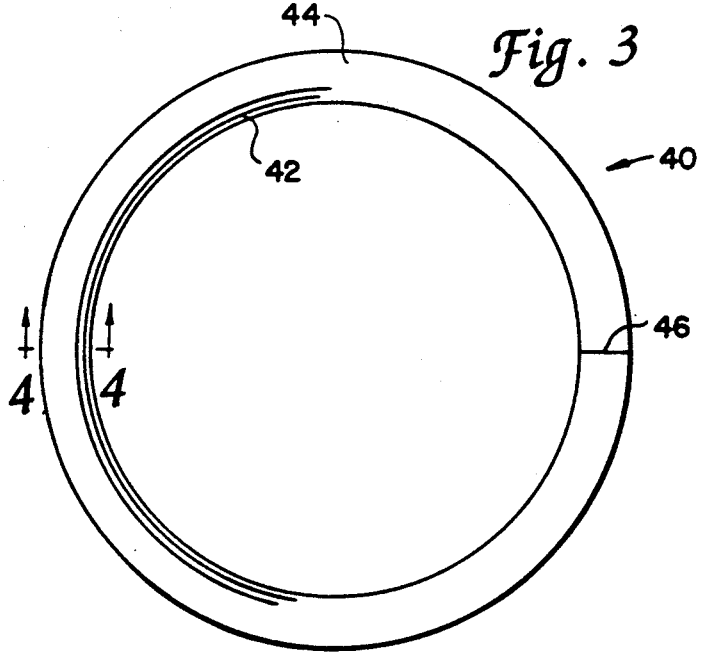
FIG. 3 is an enlarged plan view of the seal ring of FIG. 2.
Figure 4:
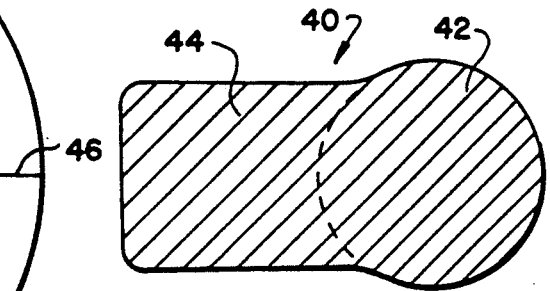
FIG. 4 is an enlarged cross-sectional view taken substantially along line 4—4 of FIG. 3.

A typical seal ring 40 in accordance with the present invention is shown in enlarged views in FIGS. 3 and 4. As there shown seal ring 40 comprises a pair of integrally formed annular sections. One section 42 lies radially inwardly of the other section 44. As is clearly seen in FIG. 4, section 42 has a greater vertical dimension than section 44. As such, section 42 provides the initial seal when the gasket assembly is compressed. Section 42 is readily deformable and compressible in use to provide a primary sealing force about the combustion opening. When seal section 42 is deformed and compressed substantially to the thickness (to the vertical dimension or height) of the second section 44, the second section resists further compression, in part because of its relative length, hence massiveness, and provides a secondary seal as well. Because it resists further substantial compression, the second section provides substantial stiffness as compared to the first section. As such the seal ring 40 has a multi-stage variable spring rate, as compared to typical round cross-section or other conventional seal rings.

Although round seal rings have typically been formed of drawn wire which is formed into a ring and butt welded, typically special shape wire rings have been formed by machining them. It has been suggested, as in the above-mentioned Pohl patent, that special shape wire rings may also be formed of drawn wire. In the present application the ring seal 40 is preferably formed from wire which is drawn to the cross-sectional configuration shown, and which is then formed into the shape needed, such as the circular shape shown, to circumscribe the cylinder bore. The ends of the wire are preferably cut square and butt connected as by welding or brazing, as at 46, to maintain the integrity of the ring seal 40. Thus manufacture of the ring is efficient and economical, and is not burdened with the special machining and assembly processes used for most special purpose seal rings or with the need for special coining dies or the like.

As seen, the two ring sections 42, 44 merge, one into the other. The highly compressible section 42 is positioned at one end (as viewed in cross-section) and the stiffening section 44 is positioned at the other end. Thus the stiffening second section 44 extends from one side only of the highly compressible section 42 so that each may be positioned at the desired precise relative positions or locations to accomplish the multi-stage sealing. Further, the configuration of the highly compressible section is such that it does not significantly indent the head and block surfaces. Where significant indenting occurs and it is necessary to replace a gasket assembly, the indented block and head surfaces must be refinished to assure effective sealing. That is typically not necessary with the gasket assembly of the present invention. A typical material employed with a seal ring 40 of the present invention may be copper wire which has been annealed at 700° F.

FIG. 5 is a load deflection graph comparing the load deflection characteristics of a typical round copper wire having a diameter of 0.046 inch and a seal ring 40 as shown in FIGS. 3 and 4. The seal ring 40 used has a first section 42 which is generally circular and which has a diameter of 0.048 inch. The tab or second section 44 is 0.040 inch in thickness and approximately 0.040 inch in length as measured from the projection of the circular first section.

As seen in FIG. 5 the round wire (curve 1) has a generally continuous gradual load deflection characteristic as the compressive stress increases to a maximum. The two stage seal ring (curve 2) of the present invention has an initial gradually increasing load deflection which parallels that of the round wire, but which then sharply increases during the second stage, i.e., when the first section height or thickness is reduced to that of the second section. Thus, under a given compressive stress, the overall thickness of the seal ring of the present invention remains greater, while producing a highly effective seal.

This has a number of important advantages. For example, thermal push has become an increasingly serious problem. In operation engines heat up. As this occurs, with current engine materials, the head frequently tends to expand and to further compress the gasket and its associated parts, such as wire rings. If a typical round wire is compressed inordinately, its thickness decreases to a point such that when an engine is cold and is started, the wire is ineffective to provide the necessary sealing until the engine again heats up. Blow-by can occur until the engine heats. As a result, the power output of the engine is reduced and damage due to the blow-by can occur. It will be apparent from FIG. 5 that the seal ring of the present invention minimizes these deleterious possibilities.

It will be apparent that the seal ring 40 may be used with the armor as shown or, where appropriate or desired, without or outside of an armor in direct confronting engagement with the head and block (or any associated cylinder sleeve). The shape of section 44 lends itself to staking directly to a gasket body.

Although a copper seal ring 40 has been described, other materials, such as steel or bimetallic materials may be used. A typical bimetallic ring may be drawn from a bimetallic strip, such as a copper/steel strip to provide a configuration like that of FIGS. 3 and 4, with the first circular section (the thicker section) being of copper and the second section being of steel, and the intersection lying generally in the zone of the projection of the dotted line circumference of the circle shown in FIG. 4.

The copper seal ring 40 has advantages in many applications, such as when used with aluminum engines where brinnelling, which typically occurs with steel rings, can be avoided. The second stage (second section) provides blow-out strength, the stiffness, radial and hoop strength and minimal relaxation of typical wire rings, and serves as a stopper, but without the deleterious effects of typical steel wires. Indeed, the second stage of FIG. 5 is similar to that of a round steel wire. Further the integral nature of the seal ring of the present invention is highly advantageous as compared to prior uses of multi-piece sealing wires, such as two round wires, to provide a seal at a combustion opening. Much closer control is provided and the tolerance variation problems inherent in multi-piece seal assemblies are eliminated.

Other arrangements and configurations of seal rings in accordance with the present invention can be used as well. Thus, for example, FIGS. 6 and 7 show a seal ring 50 fabricated in a manner similar to that of FIGS. 4 and 5 and of similar materials, but with the first section 52 and second section 54 reversed. This arrangement moves the primary or initial sealing section 52 outwardly and has the advantage of reducing the bore distortion effect of the seal ring.

In FIGS. 8 and 9 the shape of the seal section 62 of seal ring 60 has been formed as a wedge shape. Ring 60 may be fabricated in the manner in which the ring 40 is made and may be of the same materials. This offers some self-energizing characteristics and tends to force the primary seal section 62 back towards the secondary seal section 64 under load. That will tend to increase the sealing stress on the seal under engine firing conditions.

Thus it is clear that by changing the geometry and shape factor of the ring sections, the spring rate and other characteristics may be changed to optimize properties, such as, among others, adequate compressibility and blow out resistance, while, however, always gaining the multi-stage variable spring rate characteristics provided by the basic configuration of the present invention. Indeed, although a two-stage ring has been described, it will be apparent that a third stage may be of advantage under some circumstances.

It will be apparent to those skilled in the art that further modifications may be made and embodiments designed without departing from the spirit and scope of the present invention. Thus, the invention is to be construed in the context of the appended claims.

What is claimed is:

1. An automotive head gasket sealing assembly adapted to be disposed between the head and block of an automotive engine, said assembly comprising a generally flat, expansive main gasket body defining at least two combustion openings to be disposed in line with engine combustion chambers, and multi-stage combustion sealing means for each combustion opening, each said combustion sealing means comprising an integral pair of metallic annular seal ring sections of solid cross-section, said ring sections being positioned within said combustion opening to sealingly circumscribe said combustion chamber, one of said sections lying radially inwardly of the other, a first ring section being readily deformable and compressible and having a vertical dimension greater than that of a second ring section, said first ring section providing an initial compressible seal, said second ring section having a greater horizontal length than said first ring section and being less readily deformable and compressible in use and providing both a secondary seal and resistance to thermal push in use.

2. A head gasket sealing assembly in accordance with claim 1, and wherein said first ring section lies radially inwardly of the second section and defines an outer engine contacting surface which is generally curved in radial cross-section.

3. A head gasket assembly in accordance with claim 2, and wherein said first ring section is generally circular in radial cross-section.

4. A head gasket sealing assembly in accordance with claim 1, and wherein said first section is generally wedge-shaped in radial cross-section.

5. A head gasket sealing assembly in accordance with claim 1, and wherein said ring is formed by drawing and the ends are butt-connected.

6. A head gasket sealing assembly in accordance with claim 1, and wherein said metallic ring sections are formed of copper.

7. A head gasket sealing assembly in accordance with claim 1, and wherein combustion sealing means is bimetallic.

8. A head gasket assembly in accordance with claim 1, and further including means for securing said combustion sealing means to said gasket body.

9. A head gasket assembly in accordance with claim 8, and wherein said securing means comprises an annular armor body within which said combustion sealing means is positioned and by which said combustion sealing means is secured to said gasket body.

* * * * *

UNITED STATES PATENT AND TRADEMARK OFFICE
CERTIFICATE OF CORRECTION

PATENT NO. : 5,076,592

DATED : December 31, 1991

INVENTOR(S) : Robert S. Pearlstein

It is certified that error appears in the above-identified patent and that said Letters Patent is hereby corrected as shown below:

Column 3, line 39, "out" should be --cut--.

Signed and Sealed this

Twenty-seventh Day of April, 1993

Attest:

MICHAEL K. KIRK

*Attesting Officer*   Acting Commissioner of Patents and Trademarks